April 12, 1960

C. H. MAY 2,932,175

PRESSURE GENERATOR FOR LIQUEFIED GAS

Filed Oct. 30, 1956

INVENTOR.
CLAUDE H. MAY
BY
*Schmielding and Fultz*
ATTORNEYS

INVENTOR.
CLAUDE H. MAY
BY Schmieding and Fultz
ATTORNEYS

April 12, 1960

C. H. MAY 2,932,175

PRESSURE GENERATOR FOR LIQUEFIED GAS

Filed Oct. 30, 1956

INVENTOR.
CLAUDE H. MAY
BY *Schmieding and Fultz*
ATTORNEYS

INVENTOR.
CLAUDE H. MAY

April 12, 1960 C. H. MAY 2,932,175
PRESSURE GENERATOR FOR LIQUEFIED GAS
Filed Oct. 30, 1956 8 Sheets-Sheet 5

INVENTOR.
CLAUDE H. MAY
BY Schmieding and Fultz
ATTORNEYS

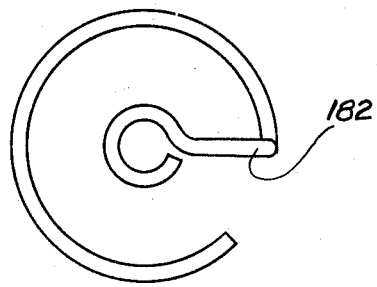
Fig. 8.
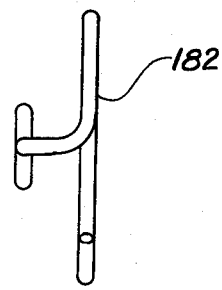
Fig. 8-A.
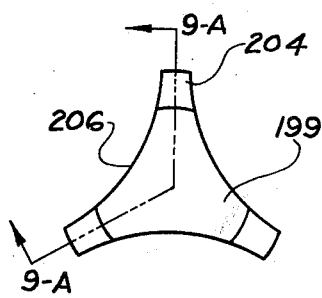
Fig. 9.
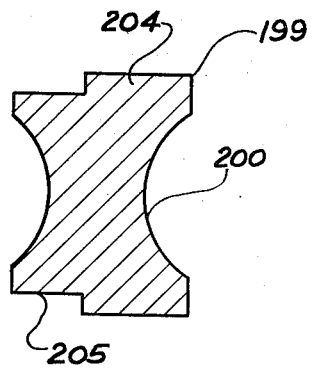
Fig. 9-A.

April 12, 1960   C. H. MAY   2,932,175
PRESSURE GENERATOR FOR LIQUEFIED GAS
Filed Oct. 30, 1956   8 Sheets-Sheet 7

INVENTOR.
CLAUDE H. MAY
BY Schmieding and Fultz
ATTORNEYS

April 12, 1960 C. H. MAY 2,932,175
PRESSURE GENERATOR FOR LIQUEFIED GAS
Filed Oct. 30, 1956 8 Sheets-Sheet 8

INVENTOR.
CLAUDE H. MAY
BY Schmieding and Fultz
ATTORNEYS

United States Patent Office 2,932,175
Patented Apr. 12, 1960

2,932,175
PRESSURE GENERATOR FOR LIQUEFIED GAS

Claude H. May, Columbus, Ohio, assignor to Herrick L. Johnston, Inc., Columbus, Ohio, a corporation of Ohio Application October 30, 1956, Serial No. 619,162

10 Claims. (Cl. 62—53)

This invention relates to pressure generators for pumping volatile liquids and particularly to novel apparatus for pumping liquefied gases having boiling point temperatures below 273 degrees Kelvin at atmospheric pressure.

In general, the apparatus of the present invention comprises a multiple cylinder mechanism for the intake and discharge of the low temperature volatile liquid to be pumped. The pumping cylinders are axially aligned and fitted with a piston rod the ends of which form pumping pistons for the pumping cylinders. The piston rod carries a central driving piston disposed in a power cylinder adapted for the intake and discharge of hydraulic fluid. The apparatus further includes fluid energy translating mechanism for hydraulic fluid which is supplied to the power cylinder alternately on opposite sides of the driving piston whereby the driving piston, piston rod, and pumping pistons are caused to shuttle back and forth as a unit.

The apparatus further includes novel valve mechanism including intake valves for the pumping cylinders which are carried, in part, by the pumping pistons to provide novel and highly efficient valve operation.

It is therefore an object of the present invention to provide a pressure generator of the piston type which generator incorporates novel fluid actuated driving mechanism for the pistons of the pumping cylinders.

It is another object of the present invention to provide a pressure generator for a liquefied gas which generator is adapted to be efficiently driven by merely connecting same in a hydraulic circuit provided by a conventional hydraulic pump, reservoir, and associated hydraulic apparatus.

It is still another object of the present invention to provide a pressure generator for a liquefied gas which generator incorporates pumping cylinders fitted with novel highly efficient valving that minimizes pressure drop in the liquefied gas in passing through the valving. Hence the formation of gas is prevented, energy loss is avoided and higher valve efficiency is achieved.

A further object of the invention is to provide a piston construction for the pumping cylinders which enables efficient sealing to be employed despite the low temperature of the liquefied gas.

Still a further object of the invention is to provide means for the elimination of metallic contact between the relative moving parts of the pumping cylinders.

An additional object of the invention is to provide means whereby the heat leak to the ultra-cold end of the pumping cylinders is greatly minimized.

A further additional object of the invention is to provide a complete unit wherein advantage is taken to the full of the ultra-low temperature liquefied gas which is pumped. Such advantage is derived from a novel arrangement which causes a great reduction of heat rise in the electric motor, hydraulic pump driving means and in the lowering of the working temperature of the hydraulic fluid which is used as the power transfer source.

Other objects and advantages of the present invention will be apparent from the following description, reference being had to the accompanying drawings wherein a preferred form of embodiment of the invention is clearly shown.

Figure 3:
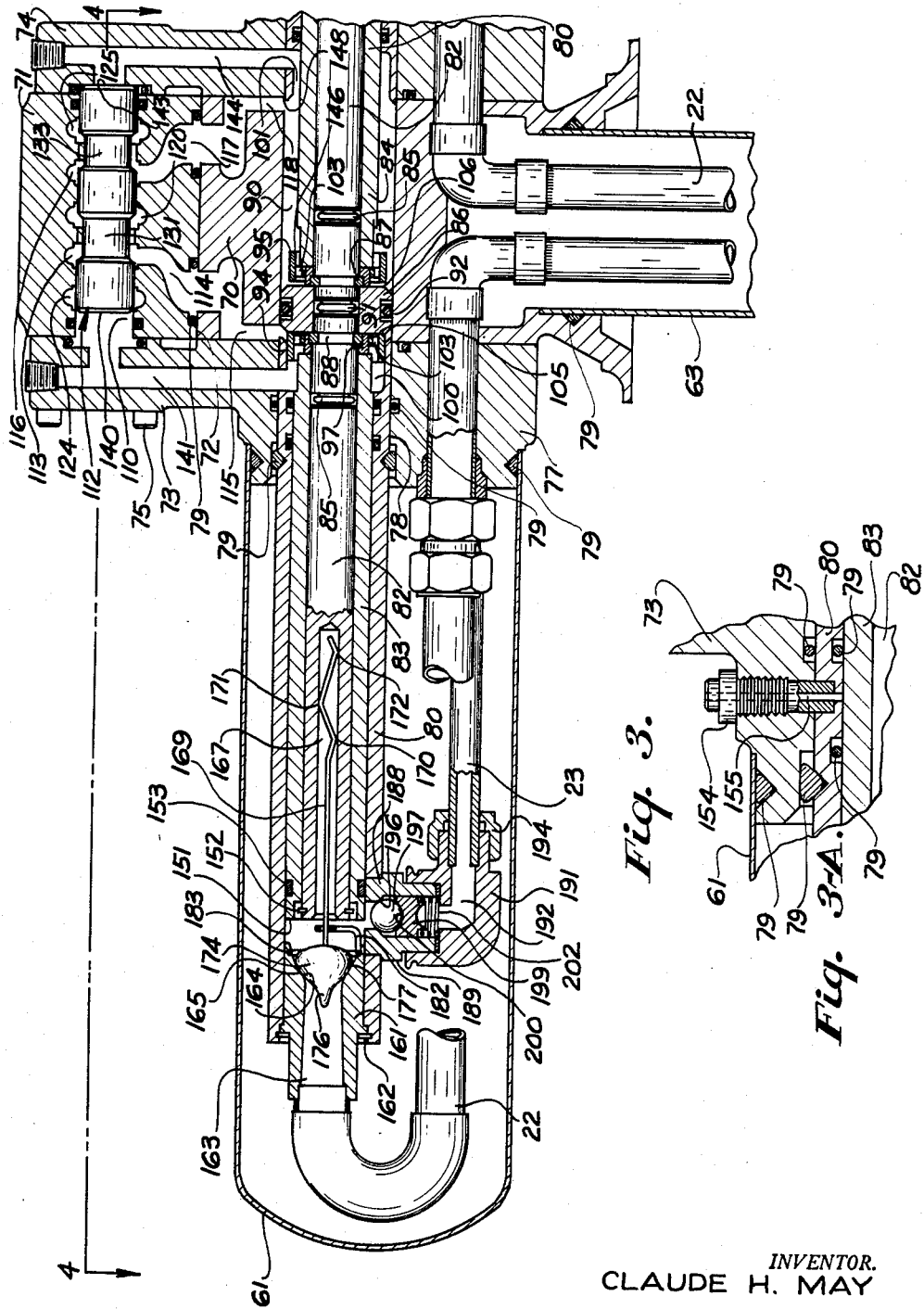
Figure 3 is an elevational view, partially in section, of the pressure generator of the preceding figures, the section being taken along the line 3—3 of Figure 4.
Figure 4:
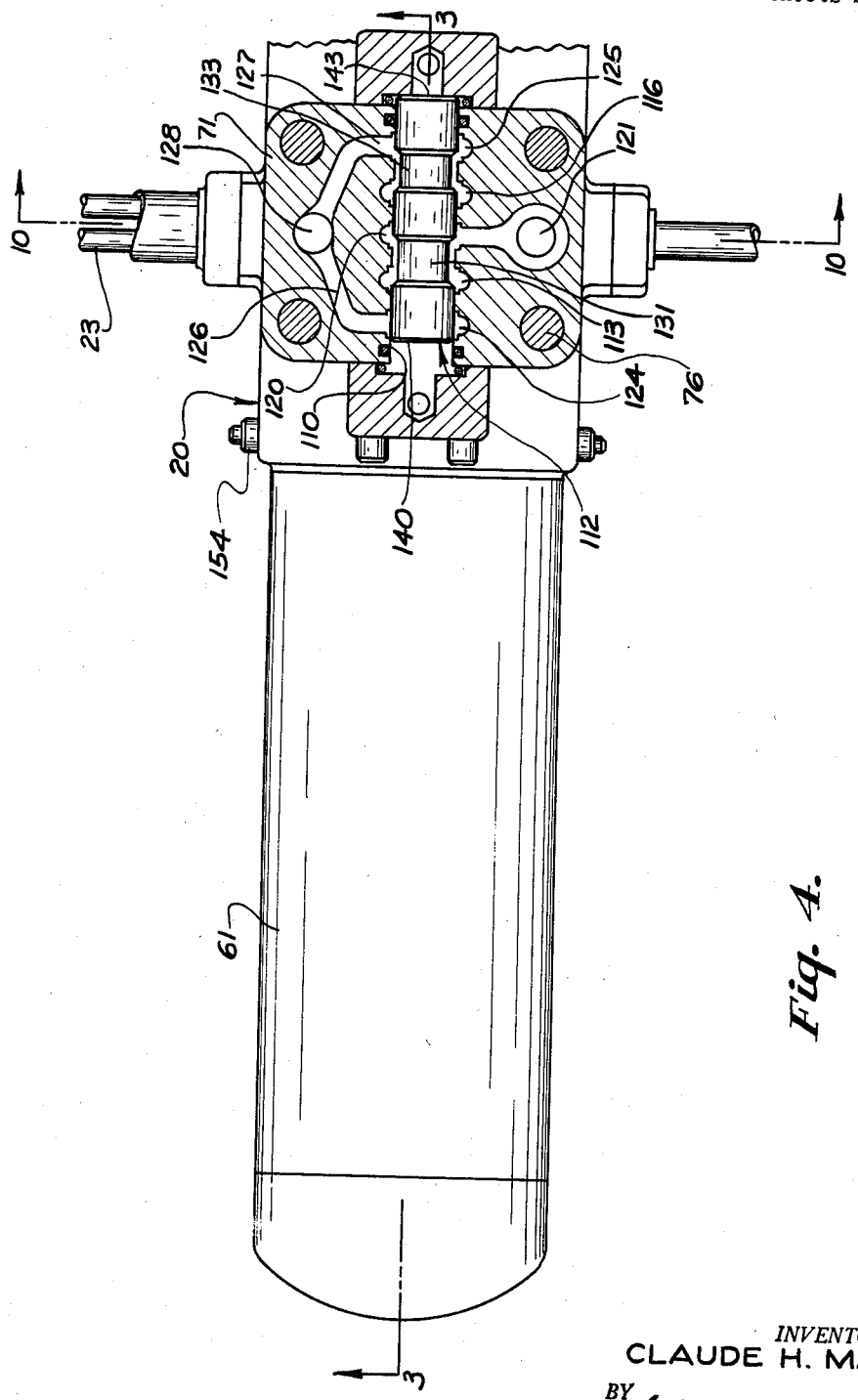
Figure 5:
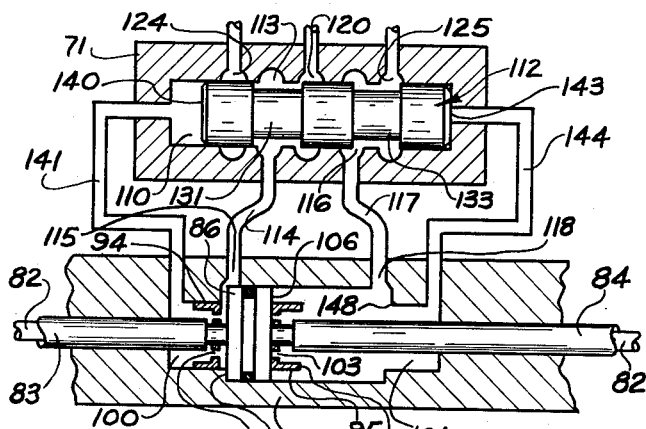
Figure 6:
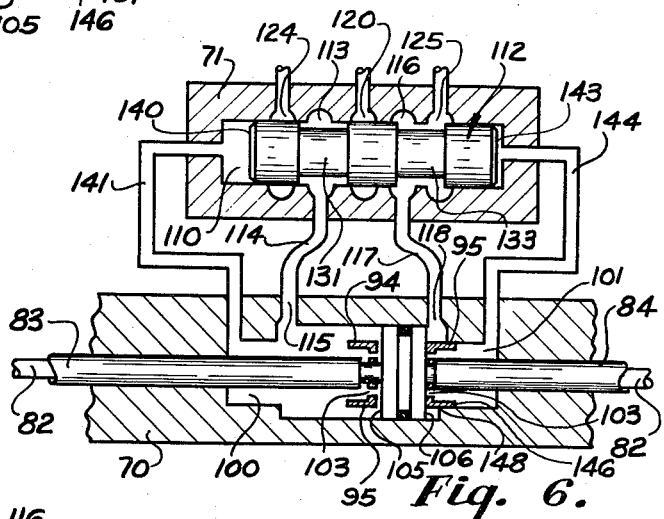
Figure 7:
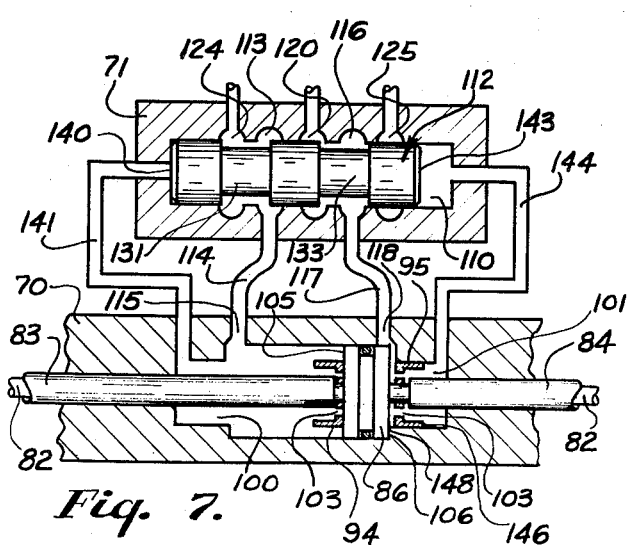
Figure 10:
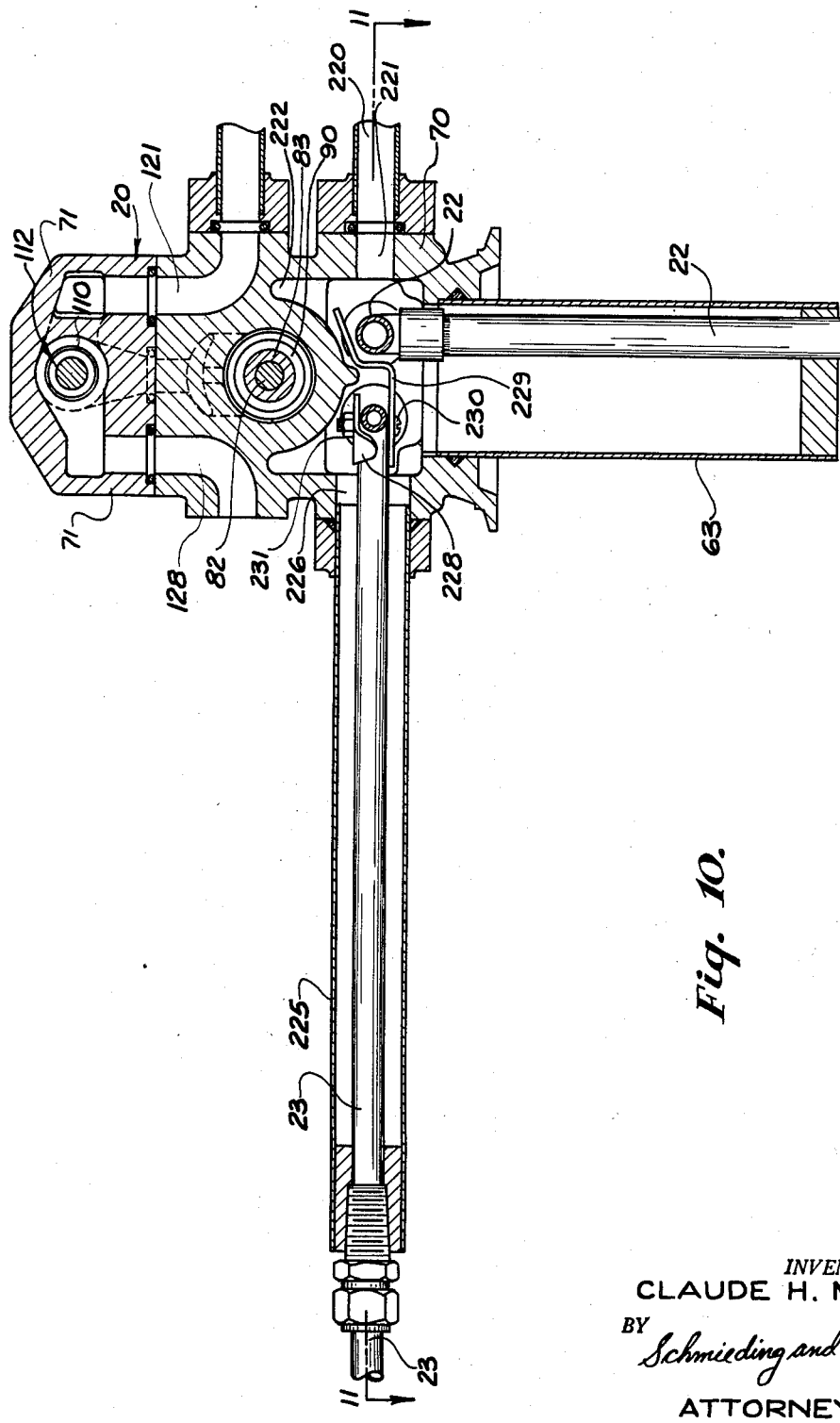
Figure 11:
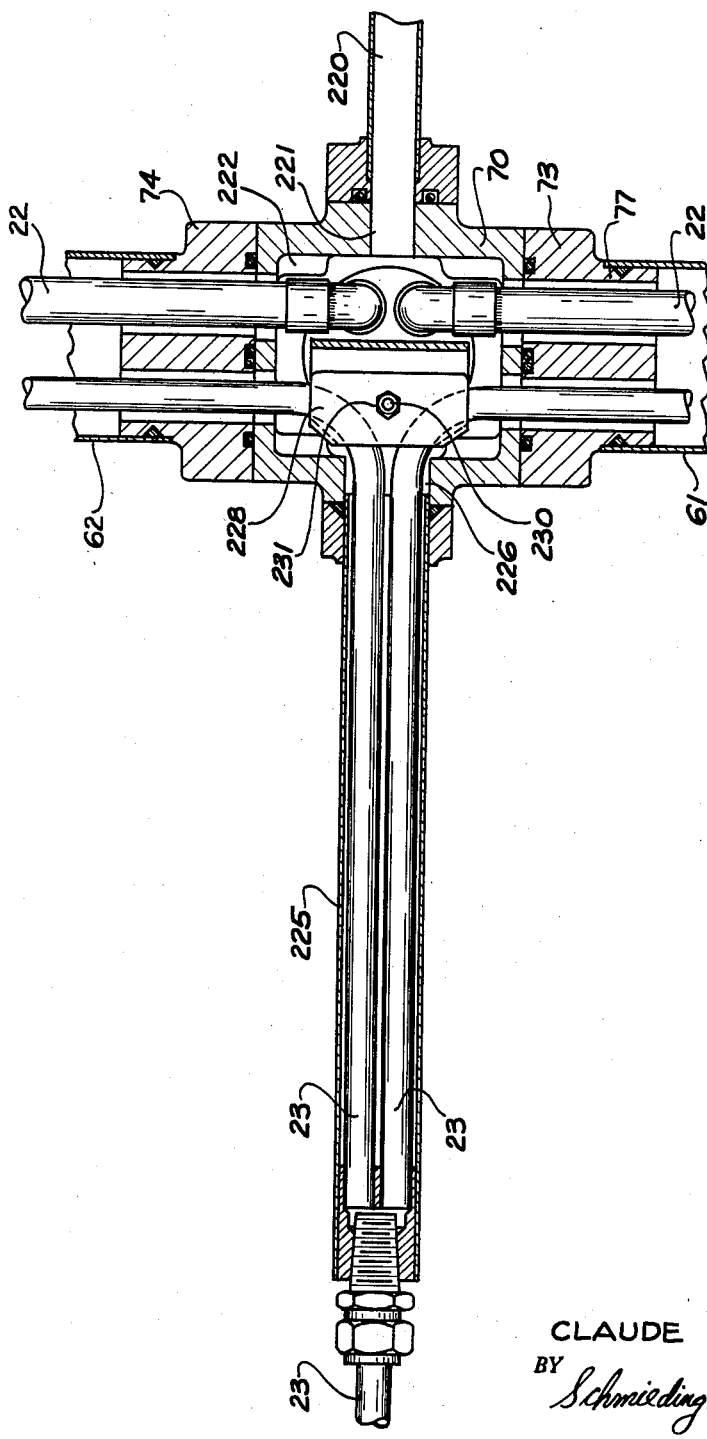

Figure 3-A is a partial sectional view showing a vent plug comprising a portion of the apparatus of Figure 3, the section being taken along a radial plane through the longitudinal axis of the vent plug 154 of Figure 4;

Figure 4 is a plan view, partially in section, of the pressure generator of preceding figures, the section being taken along the line 4—4 of Figure 3;

Figure 5 is a schematic view of the drive mechanism of the pressure generator of the preceding figures;

Figure 6 is a second schematic view corresponding to Figure 5 but showing such drive mechanism in a second configuration of operation;

Figure 7 is a third schematic view corresponding to Figures 5 and 6 but showing such drive mechanism in a third configuration of operation;

Figures 8 and 8-A are detailed end and side views of a valve stop comprising a portion of the intake valve mechanism of the pressure generator of the present invention;

Figures 9 and 9-A are detailed end and sectional views of a valve guide comprising a portion of the valve mechanism of the pressure generator of the present invention. In Figures 9-A the section is taken along line 9-A—9-A of Figure 9;

Figure 10 is an end elevational view, partially in section, of the pressure generator of the preceding figures, the section being taken along the line 10—10 of Figure 4; and Figure 11 is another plan view, partially in section, of the pressure generators of the preceding figures, the section being taken along the line 11 of Figure 10.

Figure 1:
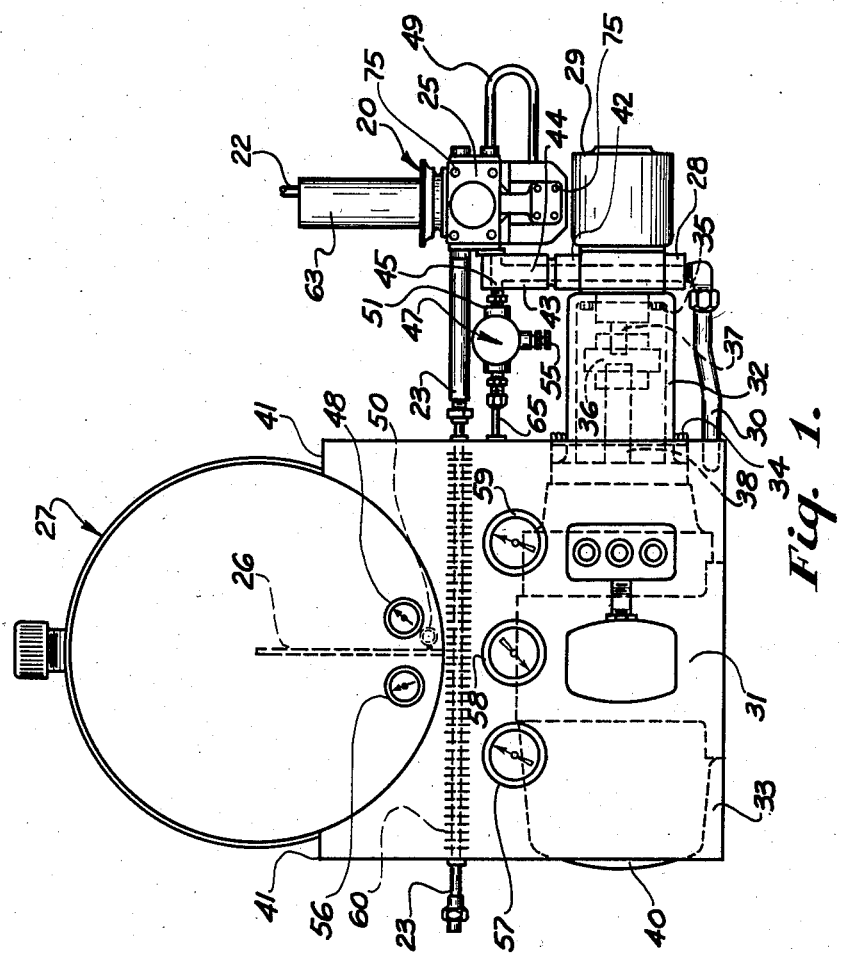
Figure 1 is an elevational view of a pressure generator for a liquefied gas and a hydraulic system for driving same, said generator and system being constructed according to the present invention.
Figure 2:
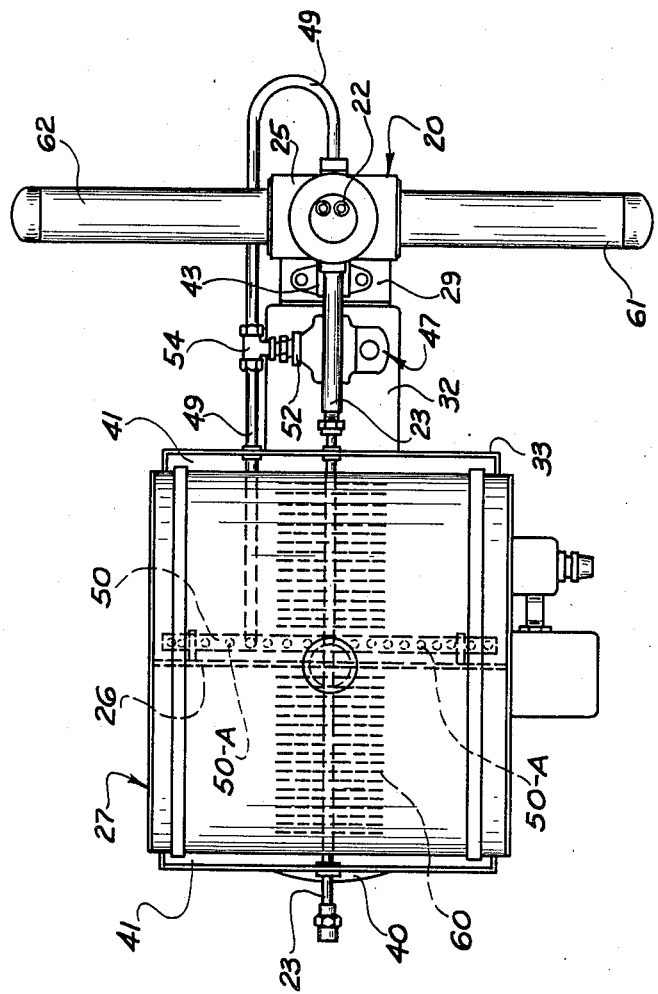
Figure 2 is a plan view of the pressure generator and hydraulic system of Figure 1.

Referring next to the drawings, in detail, Figures 1 and 2 illustrate an entire assembled pumping unit constructed according to the present invention. Such unit includes a pressure generator indicated generally at 20 and described later in detail herein. Pressure generator 20 receives liquefied gas, such as liquid nitrogen, from a suitable source, not illustrated, through intake lines 22. A discharge conduit 23 delivers pressurized liquid nitrogen to a destination, not illustrated, via discharge line 23 connected with pressure generator 20.

Pressure generator 20 includes a hydraulically actuated drive mechanism within a casing 25. Such drive mechanism is described in detail later herein. Hydraulic fluid for operating the drive mechanism of pressure generator 20 comes from the left of baffle 26 dividing the lower portion of a reservoir indicated generally at 27 which supplies fluid to the low pressure side 28 of a fluid pump 29 via a line 30. Pump 29 may be of any suitable conventional type, for example, a hydraulic pump manufactured by Denison Engineering Company, Columbus, Ohio, and designated as that company's Series 600 Pump, is suitable for the purpose. An electric motor 31 carries a pump support 32, and motor housing 33 is attached at the mounting flange by studs 34 which connect the support 32 to the electric motor 31. A coupling 36 connects driven shaft 37 of pump 29 with a shaft 38 of a suitable prime mover, such as an electric motor 31 mounted within motor housing 33. Slotted openings in the end of the fan casing 40 of electric motor 31 admit cooling air to the surface of the electric motor and into the interior of housing 33. Most of this cooling air then escapes from the interior of the motor housing 33 through the two openings 41—41. A high pressure side 42 of pump 29 is connected to the interior of casing 25 of pressure generator 20 by means of a T-block 43. A vertical passage 44 in T-block 43 has its lower end connected with the high pressure side 42 of the pump and its upper end connected with a horizontal passage 45 of T-block 43. As seen in Figure 1, the right end of horizontal passage 45 connects with casing 25 of pressure generator 20, and the left end of horizontal passage 45 leads to a relief valve indicated generally at 47. A suitable relief valve for this purpose is manufactured by Denison Enginneering Company, Ohio, and designated RV061503A by that company. The hydraulic fluid used to actuate the mechanism of pressure generator 20 leaves such pressure generator via a hydraulic fluid discharge line 49 which returns the now low pressure hydraulic fluid to reservoir 27 through transverse perforated gallery 50 set to the right of the baffle 26 as seen in Figure 2. A gauge to indicate the temperature of the returned hydraulic fluid is shown at 48 in Figure 1. The intake side 51, Figure 1, of pressure relief valve 47 communicates with the intake of pressure generator 20 at passage 45 and the outlet side 52, Figure 2, of pressure relief valve 47 connects with hydraulic fluid return line 49 at T-connection 54. It will be understood that if excessive fluid pressure occurs at the intake passage 45 leading to pressure generator 20, pressure relief valve 47 is forced open, depending on the predetermined flow pressure setting effected at adjusting means 55, and when the relief valve 47 opens fluid is released from discharge end 52 to return line 49 via T-connection 54.

As seen in Figure 1, there is a further temperature gauge 56 set on the opposite side of baffle 26 from return temperature gauge 48. This gauge 56 indicates the temperature of the hydraulic fluid flowing through low pressure line 30 to pump 29. Gauges 57, 58, and 59 may be installed on the side of motor housing 33. Gauge 57 is connected to the discharge line 23 for the liquefied gas to indicate discharge pressures. The middle gauge 58 is a vacuum gauge for indicating sub-atmospheric pressures maintained within vacuum jackets 61, 62, 63, and 225, which house the intake and discharge lines of pressure generator 20 in the manner later to be described herein. The other of the gauges 59 may be connected to pressure relief valve 47 via a line 65 and subjected to the pressure of the hydraulic fluid being delivered to pressure generator 20 for indicating the pressure of such hydraulic fluid.

A number of heat absorption fins 60, made preferably from copper or aluminum, are clamped onto liquid gas discharge line 23 in such a manner as to chill the current of air inhaled into the motor casing 33 through electric motor fan intake 40.

This chilled air scours the lower face of reservoir 27 on its passage toward and out of the escape opening 41—41.

The hydraulic fluid is thus cooled which adds to the efficiency of the hydraulic power circuit and lowers the temperature of the casing 25 containing the hydraulic drive mechanism. This lowering of temperature is of paramount importance in any body of metal in relatively close proximity to the liquid gas pumping means.

Distribution of the fins 60 toward or away from the center of reservoir 27 and the spacing of them will control the running temperature of the hydraulic fluid. The gauges 48 and 56 aid in this adjustment.

Reference is next made to Figures 3 and 4, which figures illustrate interior mechanism of pressure generator 20. Such mechanism includes a casing portion 70 to which is joined a casing portion 71 at a junction 72 by machine screws 76, Figure 4. End plates 73 and 74 are secured to casing portions 70 and 71 by machine screws 75. As seen in Figure 3, end plates 73 and 74 each include a boss 77 provided with a hole 78. Resilient seals (O rings) 79—79 are used for sealing and at all apertures between adjacent mating faces of parts 61, 62, 63, 70, 71, 73, 74, and 80 and as indicated throughout the figures. Cylinders 80—80 are inserted into the holes 78 in bosses 77 of end plates 73 and 74 and a pair of spaced resilient seals 79 are used to complete the sealing at these mating faces. The purpose of these duplicate spaced seals 79 will be more fully appreciated during later operating description. A rod shaped member 82 includes on its left end a slideably mounted sleeve 83 and on its right end a slideably mounted sleeve 84, said sleeves having a limited movement of special significance to be discussed later herein, being retained by snap rings 152. The central portion of rod member 82 carries a driving piston 86 secured to rod member 82 by means of suitable split retainers 87 carried in grooves 88. Piston 86 is disposed for reciprocating movement in a central cylinder 90, and resilient seals 91 and 92 form pressure seals between opposite sides of piston 86.

As seen in Figure 3, an annular controller 94 is mounted for limited longitudinal movement relative to rod 82, on one side of piston 86, and a second annular controller 95 is mounted for limited longitudinal movement on the other side of piston 86. Spacer collars 97 are assembled on rod 82 intermediate the ends of piston 86 and the inner ends of slideably mounted piston sleeves 83 and 84. These spacer collars 97 are of lesser diameter than piston sleeves 83 and 84 and this factor plus their length controls the limited movement of annular controllers 94 and 95. In addition the spacer collars 97 by virtue of the machines recesses on the sides next the driving piston 86 act as retainers for the radially inserted split retainers 87. As seen in Figure 3, an annular controller 94 is arranged to enter a left cylinder portion 100 in close fitting relationship therewith, and a right annular controller 95 is adapted to enter a corresponding right cylinder portion 101. Each of the annular controllers 94 and 95 include longitudinal passages 103 which are closed by confronting end surfaces 105 or 106 of piston means 86 at such times when the end surfaces of piston 86 are urged against annular controllers 94 and 95 in a manner later to be described.

Reference is next made to Figures 3 through 7 for the purpose of describing the hydraulic mechanism for alternately pressurizing cylinder 90 on either one side of piston 86, or on the other side of piston 86, as well as for alternately exhausting hydraulic fluid from central cylinder 90 either from one side of piston 86 or from the other side of piston 86. It will be noted that casing portion 71 includes a cylinder 110 in which is slideably carried a spool indicated generally at 112. Cylinder 110 includes annular passage 113 which communicates with central cylinder 90, on the left side of piston 86, via passage 114 and intake port 115, and a second annular passage 116 which communicates with central cylinder 90, on the right side of piston 86, via a passage 117 and port 118. Cylinder 110 in block 71 further includes an annular chamber 120 which communicates with vertical passage 121 leading to the high pressure side of hydraulic pump 29 via passages 44 and 45 of T-connection 43 as seen in Figure 1 and previously described. Cylinder 110 further includes annular chambers 124 and 125 both of which connect with passages 126 and 127 which in turn lead to vertically extending passage 128 and return line 49 leading to reservoir 27 as seen in Figures 1 and 2 and previously described herein. When spool 112 is in a right position, as seen in Figures 3, 4 and 5, a neck uortion 131 connects central cylinder 90, on the left side of piston 86, with pressurized annular chamber 120 which in turn connects with high pressure side of pump 29 via annular chamber 120, the interior of spool cylinder 110, passage 114, and port 115.

In addition, when the spool is in such right position, a second necked portion 133 connects central cylinder 90, on the right side of piston 86, with a source of low pressure i.e. reservoir 27, since neck 133 on spool 112 connects annular chamber 116 with annular chamber 125. With annular chamber 116 and 125 connected by neck portions 133, in the right spool position, fluid in central cylinder 90 can be exhausted to reservoir via port 118, passage 117, annular chamber 116, the interior of spool cylinder 110, annular chamber 125, passage 127 and vertical passage 128 to reservoir.

With continued reference to Figures 3 through 7, but, in particular, to Figure 7 when spool 112 is shifted to a left position in spool cylinder 110 neck portion 131 will then connect annular chambers 113 and 124 whereby central cylinder 90, on the left side of piston 86, can discharge to reservoir 27 and, with the spool in such left position, neck 133 connects pressurized annular chamber 120 with annular chamber 116 whereby central cylinder 90, on the right side of piston 86, can receive pressurized fluid from hydraulic pump 29. Hence it will be understood that piston 86, and the members connected thereto, are shifted to the right by fluid pressure when spool 125 is in a right position in spool cylinder 110, and, such piston 86 and the elements connected thereto are shifted from a right position to a left position when spool 112 is in a left position in spool cylinder 110.

With further reference to Figures 3 through 7 it will be noted that spool 112 includes a left surface 140 exposed to the pressure of fluid in a passage 141 formed in end plate 73 and such spool also includes a right surface 143 exposed to fluid pressure in a passage 144 formed in end plate 74. It will be realized that if the fluid pressure on surface 140 is greater than the fluid pressure on surface 143, spool 112 is shifted to or maintained in the right position. Conversely, if the fluid pressure on surface 143 is greater than the fluid pressure on surface 140, spool 112 is shifted to or maintained in the left position.

Referring particularly to the diagrammatic view of Figure 5, piston 86 is in the left position and spool 112 is in the right position and connects central cylinder 90, on the left side of piston 86, with pressurized fluid, and the central cylinder 90, on the other side of piston 86, free to exhaust hydraulic fluid to reservoir. At the outset of movement of piston 86 to the right, hydraulic fluid entering central cylinder 90 at port 115 institutes movement of piston 86 whereby left side surface 105 of the piston departs from the confronting surface of annular controller 94 thereby uncovering passage 103 through annular controller 94 whereby pressurized fluid passes through left cylinder portion 100, passage 141, and enters spool cylinder 110 to exert a force on left surface 140 of spool 112. Hence spool 112 is pressure biased towards the right position, Figure 5, as piston 86 moves to the right. The right surface 143 of spool 112 is then subjected to reservoir pressure only since central cylinder 90, on the right side of piston 86, is connected to reservoir 27 to permit movement of piston 86 to the right.

When piston 86 moves to the right, Figure 6, to the extent that annular controller 95 enters right cylinder portion 101 at entrance 148, then such right cylinder portion 101, passage 144, and spool cylinder 110, on the right side of spool 112, become pressurized since annular controller 95 isolates cylinder portion 101 and passage 144 from outlet port 118 leading to reservoir at the instant right end 146 of annular controller 95 enters entrance 148. It will be noted that at such entrance position of Figure 6 the right surface 106 of piston 86 is urged against the confronting left surface of annular controller 95 whereby the left end of passage 103 through such controller is closed against passage of fluid. It will be understood that annular controller 95 is urged tightly against surface 106 of piston 86 since piston 86 is being urged to the right by pressurized fluid entering at port 115.

It will be understood as the piston 86 completes its stroke, in moving from left to right, and moves from the position of Figure 6 at which position right end 146 of annular controller 95 reaches entrance 148, to the right terminal position shown in Figure 7, spool 112 is forced, by a positive unbalanced fluid pressure, from the right position of Figure 5 to the left position of Figure 7. Such unbalanced force to the left is exerted on spool 112, when in the right position prior to shifting, due to the fact that left surface 140 on spool 112 is subjected only to the delivery pressure of the hydraulic fluid entering port 115 whereas the right surface 143 of spool 112 is subjected to a higher fluid pressure due to the difference in cross-sectional areas of smaller diameter right cylinder portion 101 and larger diameter central cylinder 90. As the piston proceeds from the position of Figure 6 to the position of Figure 7 it will be understood that the fluid pressure in right cylinder portion 101 and right spool end 143 immediately starts to increase from reservoir pressure to a pressure above the pump delivering pressure being exerted on the left end 140 of spool 112. Hence spool 112 is hydraulically shifted to the left in a positive manner.

It will be understood that as soon as spool 112 has moved immediately past the midway point of travel to the left and after spool 112 is finally shifted to the left position of Figure 7 the spool connects annular chambers 116 and 120 whereby pressurized fluid is delivered through passage 117 and port 118 to cylinder 90 on the right side of piston 86. Piston 86 is thereby moved to the left, and pressurized fluid progresses through passage 103, in controller 95, and passage 144, and enters spool cylinder 110 whereby a positive fluid pressure is exerted on right end surface 143 of spool 112 to positively maintain such spool in the left position to which it has been shifted. When spool 86 moves to the left to a position wherein annular controller 94 enters left cylinder portion 100, passage 141 is pressurized which creates a build-up of pressure on left end 140 of spool 112, and when such pressure increases to a pressure value greater than the pump delivery pressure then present on right end surface 143 of the spool, such spool is shifted to the right, with positive action to the position of Figure 6 to complete the cycle. A new cycle then begins and piston 86 commences to move to the right in the manner previously described.

Reference is next made to Figures 3, 8, 8-A, 9, and 9-A for the purpose of describing the novel valve mechanism utilized in pressure generator 20. Referring first to the intake valve mechanism, the intake line 22 for the liquefied gas enters the casing through insulating jacket 63 and then leads out to the outer end of cylinder 80 within insulating jacket 61. Line 22 connects with a fitting 161 retained in the end of cylinder 80 by means of a snap ring 162. Such fitting includes an inwardly converging passage portion 163, a spherical seat 164, and an inwardly diverging passage portion 165.

With reference to Figure 3 it will be noted that the inner end of seat member 161 tapers in wall thickness, inwardly, such that the thin inner end of annular cross-section, at the retainer groove 183, is adapted to expand radially outwardly against the inner surface of cylinder 80 by the force exerted by pressurized liquefied gas on the compression stroke of the pump piston. Hence the pressurized fluid being pumped is utilized to increase the sealing effect between the confronting surfaces of seat member 161 and cylinder 80, with such increase in sealing effect being produced when pressures are high and increased sealing effect is most required.

As seen in Figure 3, the end of rod member 82 is provided with a bore 167 into which is inserted a resilient stem 169 provided with shoulders 170, 171, and 172 that frictionally engage the inner surface of bore 167. The normal distance of shoulders 170, 171, and 172 from the longitudinal center line of stem 169, is greater than the radius of bore 167 whereby resilient stem 169 constantly urges such shoulders into frictional engagement with the inner surface of the bore. The outer end of stem 169 carries a valve element 174 provided with a concave surface 176 and a spherical surface 177. On the intake stroke, when rod 82 moves to the right, from the closed position illustrated in Figure 3, stem 169 is frictionally engaged by inner surface of bore 167 whereby valve 174 immediately commences movement to the right. The liquid being pumped is then drawn inwardly through hole 163 and past seat 164. It will be noted that valve element 174 is provided with a stop 182 which is formed of spring wire to the shape illustrated in Figures 8 and 8-A and retained in a groove 183 provided in fitting 161. As valve member 174 is drawn to the right, upon movement of rod member 82 to the right, valve stop 182 engages the right side, Figure 3, of valve member 174 shortly after rod 82 commences to move to the right. Subsequent to engagement of stop 182 by valve member 174, and upon continued movement of rod member 82 to the right, the inner surface of bore 167 slides along shoulders 170, 171, and 172 of resilient stem 169.

The main purpose of the subject intake valve structure is to eliminate turbulence of the liquid entering the pump cylinders. It will be noted that the subject intake valve type is mechanically operated with the result that the amount of heat generated at the intake valves of the pump is negligible. It should be pointed out that spring pressed valve types inherently produce pressure drops and turbulence in the intake flow and hence such spring pressed valve types are undesirable for use as intake valves for pumping volatile low temperature liquefied gases.

It should be further pointed out that in the intake valve structure of Figure 3 the guide member 182, Figures 8 and 8-A, serves not only as a stop but also to center intake valve 174 and prevent its vibration during operation whereby the production of turbulence is avoided.

After rod 82 has moved completely to the right, and upon instituting its return to the left on the compression stroke for the left cylinder, valve member 174 is rapidly forced against its seat, and during further movement of rod 82 to the left, on the compression stroke, sliding frictional engagement occurs between shoulders 170, 171, and 172, of resilient stem 169, and the inner surface of bore 167. By mechanically forcing closed the intake valve 174 any bouncing of the valve on its seat is prevented and efficient valve action is achieved since valve 174 is not only moved quickly to a seated position but is maintained there by a positive mechanical force.

With continued reference to Figure 3, it will be understood that when valve member 174 is in the open position it will move to the right to a position wherein concave portion 176 on valve member 174 confronts convex seat portion 164 of fitting 161 and, at the same time, convex portion 177 on valve member 174 conforms concave portion 165 on fitting 161. Hence it will be understood that with the present valve construction the rate of convergence of flow in passage portion 163 is gradual and such flow passes through a smooth, continuous, first converging, and then diverging valve passage formed by the open configuration of the outer surface of valve member 174 and the confronting inner surface of fitting 161. With this arrangement the pressure drop and turbulence of the liquefied gas passing through the valve is reduced to a minimum whereby the boil-off of gas from the liquefied gas is prevented. Hence it will be understood that the intake valve construction, just described, provides highly efficient intake valve operation since the loss of energy by the flow at the valve is greatly reduced and the undesirable creation of gas from the volatile liquid being pumped is substantially prevented.

With reference to Figures 3, 9, and 9-A, operation of the exhaust valve mechanism will next be described. The outer end of cylinder 80 is provided with a hole 188 into which is inserted a fitting 189 with such fitting in turn being connected to an elbow 191. A passage 192 in elbow 191 communicates with the exhaust line 23 for the liquefied gas which line is secured to such elbow by a suitable fitting 194. Fitting 182 includes a seat portion 196 and a ball 197 arranged to form a closure for said seat. A valve guide 199, Figures 9 and 9-A forms an arcuate socket 200, conforming with, and adapted to receive the spherical surface of ball 197. A compression spring 202 is interposed between the lower end of valve guide 199 and the lower end of the chamber formed by fitting 189 and elbow 191.

With continued consideration of Figure 3, it will be understood that when rod 82 moves to the right, on the intake stroke for the left cylinder, the resulting reduction in pressure in such left cylinder, and the action of spring 202, maintain ball 197 in positive engagement with seat 196. On the exhaust stroke, however, when intake valve element 174 seats, the pressurized liquefied gas within cylinder 80 forces ball 197 away from its seat whereby the liquefied gas is discharged outwardly through elbow 191 and discharge line 23. As ball 197 leaves its seat 196, valve retainer 199, being provided with arcuate socket 200, maintains ball 197 centered in the valve chamber so that when the exhaust stroke is completed and the intake stroke begins, ball 197 is returned with positive action to a centered position on seat 196. Hence it will be understood that due to the presence of valve guide 199, ball 197 is always maintained centered, with positive action, relative to seat 196.

As is best seen in Figures 9 and 9-A, valve guide 199 includes a plurality of longitudinally extending spaced ribs 204 separated by concave side surfaces 206, the latter being spaced from the inner surface of the valve chamber to form passages for the flow of the liquid being pumped. Valve guide 199 further includes a necked portion 205 which forms a seat for compression spring 202 in the manner illustrated in Figure 3.

Reference is next made to Figures 10 and 11 which best illustrate the vacuum insulating means utilized in connection with the pressure generator 20 of the present invention. A vacuum line 220, connected with a suitable source of vacuum not illustrated, is connected to a hole 221 through the wall of casing portion 70. The interior chamber 222 in the lower portion of casing portion 70, as viewed in Figure 10, communicates with the interior of insulating jacket 63 and also with the interior of a smaller insulating jacket 225, the latter being in surrounding relationship with liquefied gas discharge lines 23 which leave the chamber 222 of casing 70 at a hole 226. The chamber 222 of casing 70 further includes a clamp 228 and radiation shield 229, as viewed in Figure 10, which radiation shield is clamped to liquefied gas discharge lines 23 by means of a bolt 230 and nut 231. It will be seen, from Figure 10, that radiation shield 229 shields intake lines 22 from the heat generated by friction upon reciprocation of the piston 86 in central cylinder 90. Radiation shield 229 passes the absorbed heat into the liquid nitrogen discharge lines 23.

Reference is next made to Figures 3 and 3-A for the purpose of describing the means for mounting cylinders 80—80 in the side plates 73—74, and also the structure for preventing metal to metal contact between the outer surface of piston sleeves 83—84 and the inner surfaces of cylinders 80—80. As seen in Figures 3-A and 4, a plurality of vent plugs 154 are screwed through side plate 73 and are extended into holes in cylinders 80—80 to anchor such cylinders in the casing. Vent plugs 154 include neutral pressure vent passages 155 that connect the junction of surfaces between end plate 73 and cylinder 80 with atmosphere between spaced O-ring 79 by virtue of the micro-clearance between the ports 73, 80, and 154. Hence any pressurized fluid in the hydraulic motor at 100 which may leak past the inner O-ring will pass out vent passage 155 to atmosphere instead of leaking into the insulating space formed by jacket 61. In a like manner, any pressurized fluid leaking from the hydraulic motor at 100, past the inner O-ring 79 between cylinder 80 and piston sleeve 83 will pass through vent passage 155 to atmosphere, and similarly, any pressurized liquefied gas from the cylinder head that leaks past the outer O-ring 79 between cylinder 80 and piston sleeve 83 will pass through vent passage 155 to atmosphere.

With continued reference to Figures 3 and 3-A, the O-rings 79 between piston sleeve 83 and cylinder 80 together with a bronze ring 153, which is split for mounting in a groove in sleeve 83, cooperate in centering piston sleeve 83 in cylinder 80 and maintain the outer surface of such piston sleeve 83 spaced from the inner surface of the cylinder to prevent frictional sliding engagement therebetween.

An additional function of O-rings 79 between end plate 73 and piston 80, Figures 3 and 3-A, is to centralize the cylinder in the hole 78 in the end plate 73 and to greatly reduce metal to metal contact therebetween whereby heat flow from the hydraulic motor to the cold ends of the pumping cylinders is substantially prevented.

While the form of embodiment of the present invention as herein disclosed constitutes a preferred form, it is to be understood that other forms might be adopted, all coming within the scope of the claims which follow:

I claim:

1. A hydraulic amplifier comprising, in combination, first and second cylinders each having a head and a mouth; reciprocating means comprising a first ram slidably disposed in said first cylinder and a second ram slidably disposed in said second cylinder; a casing between the mouths and forming a third cylinder including a central bore, a first end bore, and a second end bore, said end bores being of lesser diameter than and having entrances into said central bore, and said central bore being formed with a first port at one end thereof and a second port at the other end thereof; a piston secured to the reciprocating means between said rams and slidably disposed in said central bore; a source of pressurized fluid; a reservoir for receiving fluid from said third cylinder; a valve including a shiftable spool and channels for connecting said first port with said source and said second port with said reservoir when said spool is in one terminal position and for connecting said first port with said reservoir and said second port with said source when said spool is in its other terminal position, thereby to reciprocate said piston, said spool being formed with first and second end surfaces; a first passage between the first end bore of said third cylinder and said first end surface on said spool; a second passage between said second end bore of said third cylinder and said second end surface on said spool; a first annular controller on one side of said piston, said annular controller being adapted to close the entrance of said first end bore into said central bore as said piston approaches one of its terminal positions whereby the piston forces fluid through said first passage against said first end surface to shift said spool in one direction; and a second annular controller on the other side of said piston, said second annular controller being adapted to close the entrance of said second end bore into said central bore as said piston approaches its other terminal position whereby the piston forces fluid through said second passage against said second end surface to shift said spool in the other direction, each of said controllers comprising a hollow ring member having an outer diameter proportioned slidably to fit one of said end bores, each ring member being located in coaxial relationship to a ram, each ram and ring member being formed to permit limited axial shift of the ring member from a position against the piston to a position displaced from the piston whereby fluid under high pressure passes from the central bore into the end bore from which the piston is departing, each of said ring members being formed with an internal passage transverse to the piston.

2. A hydraulic amplifier in accordance with claim 1 in which each ram includes a coaxial sleeve mounted for limited sliding displacement on the ram to shift the ring member during the ram stroke from a position displaced from the piston to a position against the face of the piston which is advanced on the ram stroke.

3. A hydraulic amplifier comprising, in combination: first and second cylinders each having a head and a mouth; reciprocating means comprising a first ram slidably disposed in said first cylinder and a second ram slidably disposed in said second cylinder; a casing between the mouths and forming a third cylinder including a central bore, a first end bore, and a second end bore, said end bores being of lesser diameter than and having mouths opening into said central bore, and said central bore being formed with a first port at one end thereof and a second port at the other end thereof; a piston secured to the reciprocating means between said rams and slidably disposed in said central bore; a source of pressurized fluid; a reservoir for receiving fluid from said third cylinder; a valve including a shiftable spool and channels for connecting said first port with said source and said second port with said reservoir when said spool is in one terminal position, and for connecting said first port with said reservoir and said second port with said source when said spool is in its other terminal position, said spool being formed with first and second faces; a first passage between the first end bore of said third cylinder and said first face on said spool; a second passage between said second end bore of said third cylinder and said second face on said spool; and means carried by said reciprocating means and shiftable axially to one position for closing the port connected to the reservoir as the piston approaches its terminal positions on ram stroke, said means being shiftable axially to another position to open the end bores and piston to the port carrying high pressure fluid as the piston reverses.

4. A hydraulic amplifier comprising, in combination, first and second cylinders each having a head and a mouth; a first ram slidably disposed in said first cylinder and a second ram slidably disposed in said second cylinder; a casing between the mouths and forming a third cylinder including a central bore, a first end bore, and a second end bore, said end bores being of lesser diameter than said central bore, and said central bore being formed with a first port at one end thereof and a second port at the other end thereof; a piston secured between said rams and slidably disposed in said central bore of said third cylinder; control means including a valve for alternately introducing high pressure fluid to the sides of said piston to reciprocate the piston; a first passage from the first end bore of said third cylinder to said control means; a second passage from the second end bore of said third cylinder to said control means; a first annular controller on one side of said piston, said annular controller being adapted to enter said first end bore of said third cylinder at one terminal position of said piston in said third cylinder so that the piston forces fluid through said first passage; and a second annular controller on the other side of said piston, said second annular controller being adapted to enter said second end bore of said third cylinder at the other terminal position of said piston in said third cylinder so that the piston forces fluid through said second passage, each of said controllers comprising a hollow ring member having an outer diameter proportioned slidably to fit one of said end bores, each ring member being mounted on and located in coaxial relationship to a ram, each ram having a reduced portion adjacent the piston to permit limited axial shift of the associated ring member from a position against the piston to a position displaced from the piston whereby fluid under high-pressure passes from the central bore into the end bore from which the piston is departing, each of said controllers being formed with an internal passage transverse to the piston.

5. A hydraulic amplifier in accordance with claim 4 and a casing formed with first and second flanges for receiving the first and second cylinders, a first vacuum-tight jacket secured to the first flange to house the first cylinder, a second vacuum-tight jacket secured to the second flange to house the second cylinder, and means for evacuating the space within the jackets.

6. A hydraulic amplifier in accordance with claim 5, seals between the first and second jackets and their respective flanges, and seals between the first and second cylinders and their respective flanges.

7. A hydraulic amplifier in accordance with claim 5 in which the casing is additionally formed with third and fourth flanges, third and fourth vacuum jackets secured to said flanges, and fluid supply and fluid discharge lines within said third and fourth vacuum jackets, respectively.

8. A hydraulic amplifier in accordance with claim 4 in which the first and second cylinders are provided with intake valves and the first and second rams are formed with internal bores at their ends remote from the piston, each of said intake valves comprising a valve seat, a valve head formed in pear-like configuration and complementary to said seat, a relatively thin valve stem slidably projecting into the internal bore of its associated ram, said stem being formed with zig-zag convolutions frictionally but yieldably engaging said bore, and a guide secured in fixed relation to the seat for limiting the opening movement of the valve when the ram is on its intake stroke and permitting the valve to close when the ram is on its exhaust stroke.

9. The combination of a fluid pump having a low pressure intake and a high pressure outlet, a reservoir for containing the pumping fluid and formed with an exterior surface and a baffle defining two interior zones, a connection between the fluid-pump intake and one of said zones; a hydraulic amplifier comprising a cylinder having a cryogenic liquid discharge line and intake and exhaust valves communicating with the cylinder, a cryogenic liquid pumping ram reciprocally mounted in the cylinder, and a control valve in communication with said high pressure outlet and actuated by said pumping fluid for controlling the reciprocation of said ram, heat being transferred from said pumping fluid through the hydraulic amplifier to said cryogenic liquid; a fan positioned to blow cooling air along the exterior surface of said reservoir to cool the same, heat exchange means formed on the cryogenic liquid discharge line for transferring heat from the cooling air to said cryogenic liquid, said heat exchange means being disposed between said fan and said surface, said control valve having an outlet in communication with said other zone to return outlet pumping fluid to the other of said zones so that heat is transferred from intake pumping fluid to pumping fluid returned to the reservoir, whereby the intake pumping fluid is cooled by the outlet pumping fluid and by the air from the fan, the outlet pumping fluid is cooled by the cryogenic liquid, and the air passing from the fan to said reservoir surface is chilled by the cryogenic liquid.

10. The combination of a fluid pump having a low pressure intake and a high pressure outlet, a reservoir for containing the pumping fluid and formed with an exterior surface, a connection between the fluid-pump intake and said reservoir; a hydraulic amplifier comprising a cylinder having a cryogenic liquid discharge line and intake and exhaust valves communicating with the cylinder, a cryogenic liquid pumping ram reciprocally mounted in the cylinder and a control valve in communication with said high pressure outlet and actuated by said pumping fluid for controlling the reciprocation of said ram, heat being transferred from said pumping fluid through the hydraulic amplifier to said cryogenic liquid, a fan positioned to blow cooling outlet air along the exterior surface of said reservoir to cool the same, heat exchange means formed on the cryogenic liquid discharge line for transferring heat from the cooling air to said cryogenic liquid, said heat exchange means being disposed between said fan and said surface, said control valve having an outlet in communication with said other zone to return outlet pumping fluid to the reservoir so that heat is transferred from intake pumping fluid to pumping fluid returned to the reservoir, whereby the intake pumping fluid is cooled by the outlet pumping fluid and by the air from the fan, the outlet pumping fluid is cooled by the cryogenic liquid, and the air passing from the fan to said reservoir surface is chilled by the cryogenic liquid.

References Cited in the file of this patent

UNITED STATES PATENTS

| Number | Name | Date |
|---|---|---|
| 71,218 | Ritchie | Nov. 19, 1867 |
| 295,341 | Boom | Mar. 18, 1884 |
| 328,469 | Davis | Oct. 20, 1885 |
| 1,253,003 | Colson | Jan. 8, 1918 |
| 1,486,551 | Smith | Mar. 11, 1924 |
| 1,585,544 | Hubbard | May 18, 1926 |
| 1,931,938 | Pippin | Oct. 24, 1933 |
| 2,135,721 | Landenberger | Nov. 8, 1938 |
| 2,212,503 | Nickell | Aug. 27, 1940 |
| 2,277,569 | Vickers | Mar. 24, 1942 |
| 2,296,647 | McCormick | Sept. 22, 1942 |
| 2,470,372 | Roth | May 17, 1949 |
| 2,598,816 | Mesinger | June 3, 1952 |
| 2,675,682 | Dobson | Apr. 20, 1954 |